United States Patent
Yabe et al.

[11] Patent Number: 6,119,813
[45] Date of Patent: Sep. 19, 2000

[54] LUBRICANT FEEDER AND LINEAR APPARATUS

[75] Inventors: Toshikazu Yabe, Kanagawa; Takaaki Hoshi, Gunma, both of Japan

[73] Assignee: NSK Ltd., Tokyo, Japan

[21] Appl. No.: 09/094,346

[22] Filed: Jun. 10, 1998

[30] Foreign Application Priority Data

Jun. 10, 1997 [JP] Japan .................................. 9-152452

[51] Int. Cl.⁷ ................................................. F16C 17/00
[52] U.S. Cl. .................................. 184/5; 184/100; 384/13
[58] Field of Search .......................... 184/5, 100; 384/13, 384/43, 44, 45, 902, 907, 279

[56] References Cited

U.S. PATENT DOCUMENTS

| | | | |
|---|---|---|---|
| 3,855,135 | 12/1974 | Newingham et al. | 252/15 |
| 4,239,632 | 12/1980 | Baile | 252/12 |
| 4,601,840 | 7/1986 | Zehler et al. | 252/56 S |
| 5,494,354 | 2/1996 | Tsukada | 384/13 |
| 5,590,965 | 1/1997 | Yabe et al. | 384/15 |
| 5,694,811 | 12/1997 | Tsukada | 74/467 |
| 5,772,333 | 6/1998 | Yabe et al. | 384/13 |

FOREIGN PATENT DOCUMENTS

| | | | |
|---|---|---|---|
| 62-60565 | 12/1987 | Japan | F16C 33/66 |
| 63-23239 | 5/1988 | Japan . | |
| 6-346919 | 12/1994 | Japan | F16C 29/08 |
| 7-4952 | 1/1995 | Japan | F16H 25/42 |

OTHER PUBLICATIONS

Federal Register vol. 58, No. 3 Dated Jan. 6, 1993.

*Primary Examiner*—David M. Fenstermacher
*Attorney, Agent, or Firm*—Sughrue, Mion, Zinn, Macpeak & Seas, PLLC

[57] ABSTRACT

A lubricant feeder which is highly safe and usable, e.g., in an oil seal for a food-processing machine is disclosed. Lubricant feeders 11 each comprising a solid synthetic resin containing a lubricant feed the lubricant to side seals 10 and a rail 1, which all require lubrication. Each lubricant feeder 11 is interposed between the side seal 10 and a reinforcing plate 20 and is fixed to an end cap 2B. The lubricant is a white mineral oil or a grease including a white mineral oil as a base oil and aluminum soap as a thickener, and the synthetic resin comprises a polyolefin resin.

8 Claims, 6 Drawing Sheets

LUBRICANT FEEDER AND LINEAR APPARATUS

BACKGROUND OF THE INVENTION

The present invention relates to a member for feeding a lubricant. More particularly, this invention relates to a lubricant feeder which is interposed between members rolling or sliding on each other, and is used for lubricating these members. The present invention also relates to a linear apparatus having such a member for feeding a lubricant.

The present application is based on Japanese Patent Application No. Hei. 9-152452, which is incorporated herein by reference.

This kind of lubricant feeder, which comprises a polymer containing a lubricant, is disposed so as to be in contact with a part required to be lubricated, such as, e.g., a linear guide bearing, a ball screw, or an oil seal, and to automatically feed the lubricant to the part.

Examples of this kind of lubricant feeder include the lubricant feeder described in Japanese Utility Model Unexamined Publication No. Hei. 7-4952 (hereinafter referred to as "the first prior art example") and that described in Japanese Patent Unexamined Publication No. Hei. 6-346919 (hereinafter referred to as "the second prior art example").

The first prior art example, which comprises a polymeric member containing a lubricant, is fitted to a ball screw at each end of the nut so as to be slide on the screw groove of the thread shaft and to serve also as a sealing member. The lubricant gradually oozes out of the polymeric member with the lapse of time and is automatically fed to the balls via the screw groove. Thus, the lubricant feeder performs its lubricating function over long periods of time.

The second prior art example, which is a sealing member made of a rubber or synthetic resin containing a lubricant, is used, for example, as side seals to be attached to the slider of a linear guide so that the sealing lip parts thereof are in contact with rolling element rolling grooves formed on the side surfaces of the guide rail. The lubricant gradually oozes out of the rubber or synthetic resin with the lapse of time and is automatically fed to the rolling elements via the rolling element rolling grooves. Thus, the lubricant feeder performs its function over long periods of time.

However, the conventional lubricant feeders have the following problems. The first problem is that when the conventional lubricant feeders are used in food-processing machines for food production, etc., there is a possibility that the lubricant oozing out of the lubricant feeder might contaminate the foods which are being produced. In the conventional lubricant feeders, no care has been taken to use a lubricant harmless to the human body. It is therefore difficult from a safety standpoint to use the prior art lubricant feeders in the field of food-processing machines and the like.

The second problem is as follows. There is a possibility that components of the synthetic resin (or rubber) constituting the lubricant feeder interposed between members sliding on each other might contaminate the food due to friction with these members. In this point also, no care has been taken to use a synthetic resin or rubber harmless to the human body as the material constituting a conventional lubricant feeder. This also makes it difficult to use the prior art lubricant feeders in food-processing machines or the like.

SUMMARY OF THE INVENTION

It is an object of the present invention to provide a highly safe lubricant feeder usable in food-processing machines or the like to thereby eliminate the problems described above.

The above object is accomplished by the present invention with a lubricant feeder comprising a synthetic resin containing a lubricant and having a constitution which is suitable for application to members requiring lubrication and enables the lubricant to gradually ooze out of the synthetic resin and be fed to the members, said lubricant comprising a white mineral oil or a grease comprising a white mineral oil as a base oil and an aluminum soap as a thickener, and said synthetic resin comprising a polyolefin resin.

In addition, it is the other object of the present invention to provide a linear apparatus having a highly safe lubricant feeder which is usable in food-processing machines or the like to thereby eliminate the problems described above.

The above-mentioned other object is accomplished by the present invention with a linear apparatus having a lubricant feeder which is made of synthetic polyolefin resin, which is mounted on a guided member to be guided by a guiding member, for gradually oozing out and feeding a lubricant to the guiding member, wherein the lubricant is selected from a group consisting of:

a white mineral oil; and a grease including a white mineral oil as a base oil and aluminum soap as a thickener;

The above-mentioned linear apparatus may be a linear guide bearing or a ball screw.

Further, the above-mentioned other object is also accomplished by the present invention with a linear guide apparatus comprising a guiding member and a guided member a movement of which is guided by the guiding member, wherein the inside of the guided member is filled with a grease including a white mineral oil as a base oil and aluminum soap as a thickener.

DETAILED DESCRIPTION OF THE PREFERRED EMBODIMENTS

Figure 1:
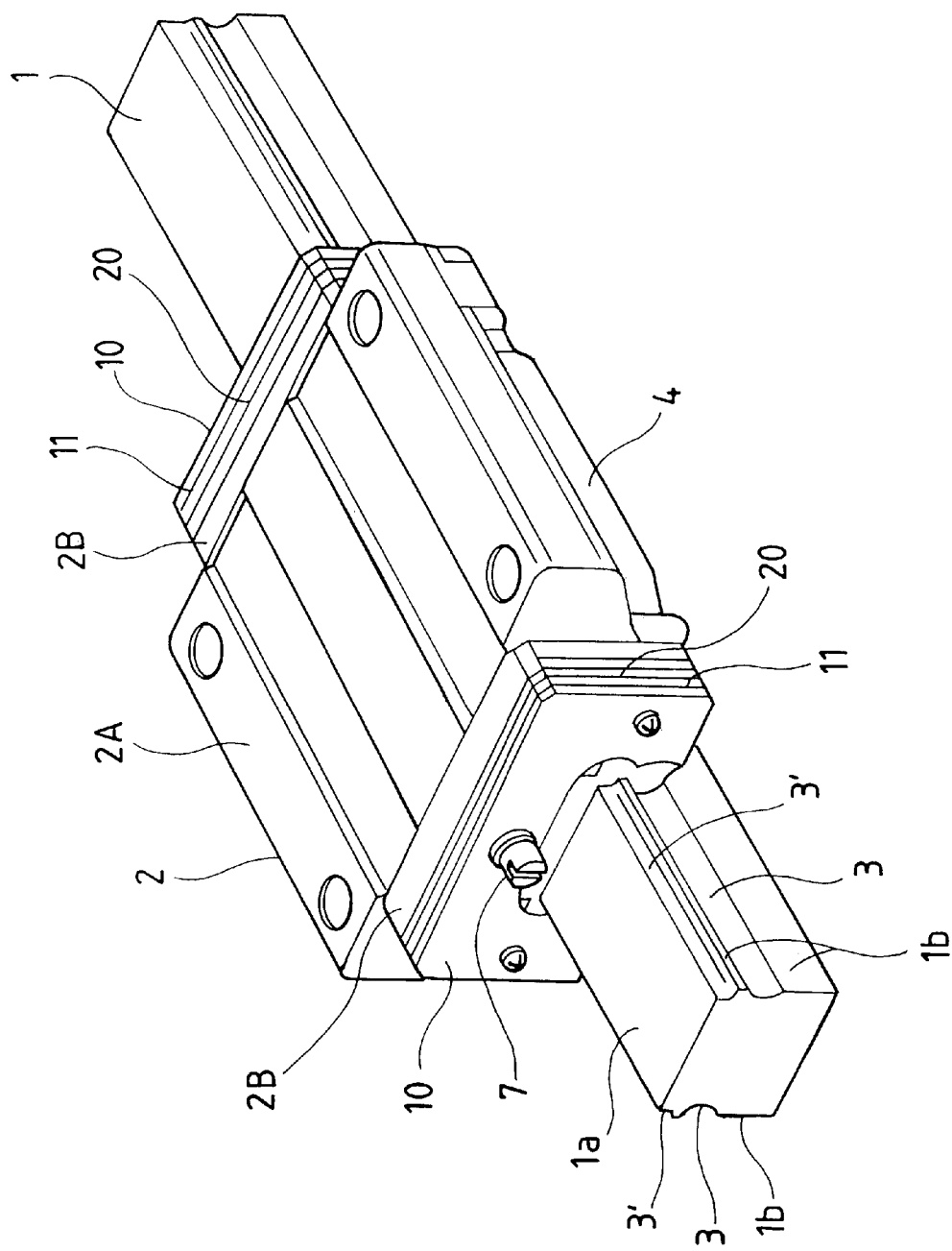
FIG. 1, showing the first embodiment of the present invention, is a slant view illustrating the whole of a linear guide containing lubricant feeders integrated thereinto.

The content of the lubricant in the lubricant feeder is from 10 to 90% by weight. If the content thereof is lower than 10% by weight, the lubricant amount is too small to sufficiently feed the lubricant to members requiring lubrication. On the other hand, if the content thereof exceeds 90% by weight, the relative amount of the synthetic resin is small, resulting in a molded article reduced in mechanical properties such as strength. The preferred range of the lubricant content from the standpoint of a balance between required lubricity and mechanical strength is from 50 to 80% by weight.

The synthetic resin used in the lubricant feeder of the present invention will now be explained. The lubricant-containing polymer constituting the lubricant feeder of the present invention is preferably in a solidified state containing a lubricant, and comprises a synthetic polyolefin resin as the main component. This synthetic resin is preferably one which conforms to the regulations provided by the FDA (Food and Drug Administration, U.S.A.). Examples thereof include polyethylene, polypropylene, and polymethylpentene. These synthetic polyolefin resins themselves usually contain a slight amount (about 0.001 to 0.05% by weight) of one or more stabilizers for preventing deterioration, e.g., an antioxidant and, if desired, an ultraviolet absorber (light stabilizer) for a grade especially in need of weatherability. Because synthetic polyolefin resins themselves are harmless, these stabilizers are selected from those which are highly safe for the human body.

These synthetic polyolefin resins have excellent wear resistance even when interposed between members which are in contact with each other while undergoing sliding, rolling, or other friction with each other. From the standpoint of wear resistance, the synthetic resin is preferably a high-density or ultrahigh-molecular (ultrahigh-density) polyolefin.

Examples of antioxidants which conform to the regulations provided by the FDA and are effective for synthetic polyolefin resins include N,N'-dinaphthyl-p-phenylenediamine, 2,6-di-tert-butyl-4-methylphenol, and 2(3)-tert-butyl-4-hydroxyanisole, 2,2'-methylenebis(4-methyl-6-tert-butylphenol), 2,2'-methylenebis(4-ethyl-6-tert-butylphenol), 4,4'-methylenebis (2,6-tert-butylphenol), 2,2'-dihydroxy-3,3'-di(α-methylcyclohexyl) -5,5'-dimethyldiphenylmethane, 1,3,5-trimethyl -2,4,6-tris(3,5-di-tert-butyl-4-hydroxybenzyl)benzene, 4,4'-thiobis(6-tert-butyl-3-methylphenol), 1,1,3-tris(2-methyl-4-hydroxy-5-tert-butylphenyl)butane, 4,4'-butylidenebis(3-methyl-6-tert-butylphenol), n-octadecyl 3-(4'-hydroxy-3',5'-di-tert-butylphenyl) propionate, tetrakis[methylene-3-(3',5'-di-tert-butyl-4'-hydroxyphenyl)propionate]methane, tris (nonylphenyl) phosphite, tris(mixed mono- and di-nonylphenyl) phosphite, dilauryl thiodipropionate, distearyl thiodipropionate, and dimyristyl 3,3'-thiodipropionate.

Preferred among these from the standpoint of higher safety are the antioxidants which themselves are safe substances conforming to the FDA regulations. Examples thereof include 2,6-di-tert-butyl-4-methylphenol, 2(3)-tert-butyl-4-hydroxyanisole, and dilauryl thiodipropionate.

Examples of ultraviolet absorbers (light stabilizers) which conform to the FDA regulations and are effective for the synthetic polyolefin resin used in the present invention include 2-hydroxy-4-n-octoxybenzophenone and 2-(2'-hydroxy-3'-tert-butyl-5'-methylphenyl)-5-chlorobenzotriazole.

The synthetic polyolefin resin containing a slight amount of any of the stabilizers enumerated above basically conforms to the FDA regulations and is suitable for use in the lubricant feeder of the present invention.

The synthetic polyolefin resin does not necessarily contain those additives.

Preferred lubricants which can be used in the lubricant feeder of the present invention include a white mineral oil conforming to the FDA regulations and a grease comprising a white mineral oil as a base oil and an aluminum soap as a thickener and conforming to the FDA regulations.

Other oil ingredients may be incorporated as additives into the lubricant for the purpose of improving lubricity as long as the incorporation thereof does not impair safety. Examples of such usable oil ingredients include medium-chain fatty acid triglycerides having the chemical formula given below, which are ester oils conforming to the FDA regulations and are harmless even after coming into foods, etc.

Chemical Formula

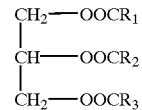

$R_1$, $R_2$, $R_3$: linear saturated aliphatic hydrocarbon group ($C_5$–$C_{18}$)

The incorporation amount of the ester oil is preferably up to 30% by weight based on the total lubricant amount from the standpoint of obtaining a satisfactory compatibility between the synthetic polyolefin resin, having low polarity, and the ester oil, having high polarity, so as to maintain the oil retention of the product. Incorporation amounts of the ester oil exceeding 30% by weight are undesirable in that such a lubricant not only is poorly retained by the polymeric member in a large amount, but also oozes out of the polymeric member at an increased rate, resulting in a shortened lubrication life.

Additives, e.g., antioxidants, which are highly safe like the additives for use in the synthetic polyolefin resin can be added to the lubricant. The lubricant feeder of the present invention is produced by a low-cost injection molding process which comprises mixing the polymer with the lubricant, melting the mixture by heating, injecting the melt into a given mold, and cooling the mold while pressurizing the contents to solidify the same.

Alternatively, another process may be used in which the mixture is formed into an appropriate shape by injection molding or hot forming and the resultant molding is mechanically processed to impart a desired shape thereto. It is also possible to form a lubricant feeder itself by hot forming.

The lubricant feeder of the present invention is highly safe because it is constituted of a lubricant-containing polymer comprising a synthetic polyolefin resin and a lubricant conforming to the FDA regulations which comprises a white mineral oil or a grease comprising a white mineral oil as a base oil and an aluminum soap as a thickener. Therefore, the lubricant feeder can be advantageously used, e.g., in bearings, ball screws, and oil seals for medical apparatuses, machines for cosmetic production, etc., as well as for food-processing machines.

Embodiments of the lubricant feeder of the present invention include seal members of a linear guide, a lubricant feeder for the seal lip of an oil seal, and sealing lubricant feeders of a ball screw.

Figure 2:
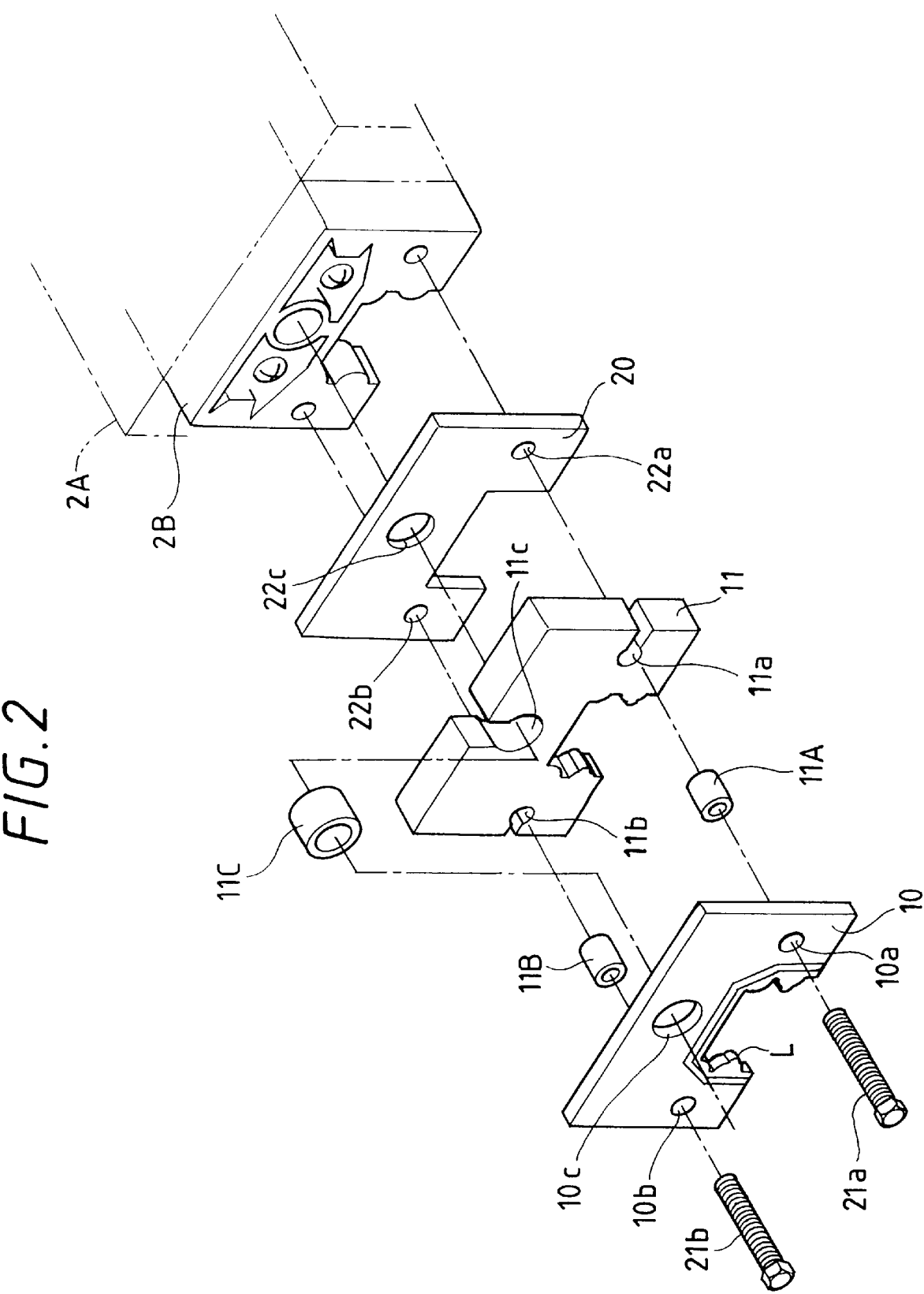
FIG. 2 is an exploded slant view of the linear guide, which shows a rail-direction end of the slider thereof.
Figure 3:
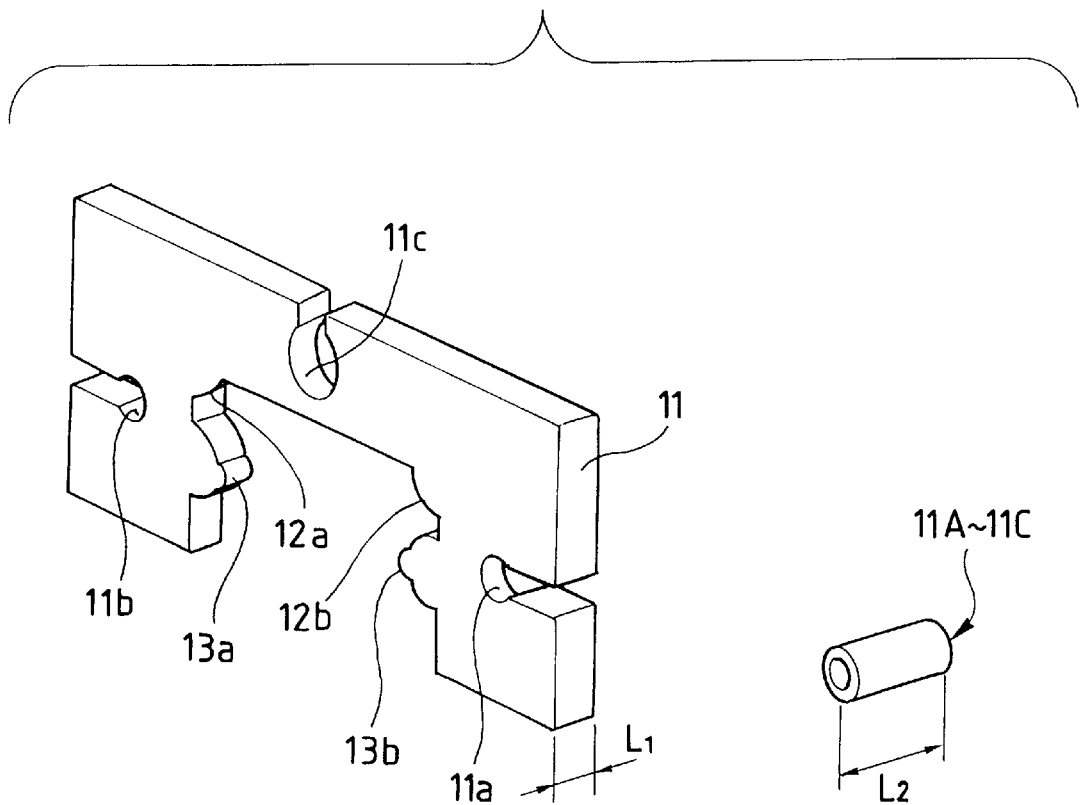
FIG. 3 is a perspective view of one of the lubricant feeders.

Embodiments of the present invention will be explained below by reference to the drawings, in which FIGS. 1 to 3 illustrate a lubricant feeder, as the first embodiment of the present invention, integrated into each side seal of a linear guide.

A slant view of the whole linear guide is shown in FIG. 1. As illustrated in FIG. 1, this linear guide comprises a guide rail 1 extending in the axis direction and having rolling element rolling grooves 3 and 3' on external surfaces thereof and a slider 2 fitted to the guide rail 1 so as to straddle the same.

The slider 2 has a slider main body 2A, and its wings 4 located at both ends in the width direction each has, on its inner side facing the rail, rolling element rolling grooves facing the rolling element rolling grooves 3 and 3' of the guide rail 1. Each wing 4 further has rolling element return paths which extend through the thick part of the wing in the axis direction, and which are parallel to and face the rolling grooves of the wing 4.

On the other hand, each end cap 2B has curved paths for connecting the rolling element rolling grooves of the slider main body 2A to the corresponding rolling element return paths in parallel thereto. Thus, the rolling element rolling grooves, the rolling element return paths, and the curved paths on both ends constitute rolling element circulating paths. The rolling element circulating paths are packed with many rolling elements, e.g., steel balls.

The slider 2 straddling the guide rail 1 smoothly travels on the guide rail 1 by means of the rolling of the rolling elements disposed in the spaces each formed by a pair of rolling element rolling grooves facing each other. During the travel, the rolling elements infinitely circulate through the rolling element circulating paths within the slider.

The end caps 2B respectively located at both ends of the slider 2 in the rail length direction each has, at the end thereof, a side seal 10 which seals the gap between the guide rail 1 and the slider 2. As shown in the exploded slant view of FIG. 2, a lubricant-containing polymeric member 11 as a lubricant feeder has been interposed between the side seal 10 and a reinforcing plate 20. Numeral 7 denotes a grease nipple used, if desired, for feeding a grease to the rolling elements disposed in the slider 2.

As shown in FIG. 2, each side seal 10 is constituted of a nearly U-shaped steel plate conforming to the contour of the end cap 2B and a nitrile rubber which has almost the same shape as the steel plate and has been integrally bonded to the outer side of the steel plate. Each side seal 10 has a sealing lip part L which is in contact with the guide rail 1. The sealing lip part L has a shape conforming to the shape of the section of the guide rail 1 so that it can seal the gap between the slider 2 and the guide rail 1. Namely, the lip part L has been molded into a shape which enables the lip part L to slide on the upper surface 1a and outer side surfaces 1b of the guide rail 1 and also on the rolling element rolling grooves 3 and 3' while being in contact therewith.

The side seals 10 each has, in both wings thereof, through-holes 10a and 10b for penetrating attaching screws therethrough, and further has, in the connecting part thereof which connects the wings to each other, a through-hole 10c for a grease nipple.

The lubricant-containing polymeric member 11, comprising a molding of a lubricant-containing polymer, has been formed from a material composed, for example, of a polyethylene blend conforming to the FDA regulations and consisting of 20% by weight high-density polyethylene (molecular weight, $1 \times 10^4$ to $5 \times 10^5$) and 10% by weight ultrahigh-molecular polyethylene (molecular weight, $1 \times 10^6$ to $5 \times 10^6$) and a lubricant conforming to the FDA regulations and consisting of 70% by weight white mineral oil, by plasticating (melting) the material with an injection molding machine, injecting the melt into a given mold, and then cooling the mold while pressurizing the contents to solidify the same.

As shown in the enlarged slant view of FIG. 3, the polymeric member 11 is nearly U-shaped so as to conform to the contour of the end cap 2B, and has a given thickness which, for example, is needed for securing a necessary lubricant amount. The inner contour of the polymeric member 11 conforms to the outer contour of the cross section of the guide rail 1 so that the polymeric member 11 is in close contact with the upper surface 1a and side surfaces 1b of the guide rail 1. The polymeric member 11 further has projections 12a and 12b corresponding to the upper rolling element rolling grooves 3' of the guide rail 1 and projections 13a and 13b corresponding to the lower rolling element rolling grooves 3 of the guide rail 1 so that the inner contour of the polymeric member 11 conforms to the outer contour of the cross section of the guide rail 1.

The lubricant-containing polymeric members 11 each has, in both wings, through-holes 11a and 11b for penetrating attaching screws therethrough for attachment to the end cap 2B of the slider. These through-holes 11a and 11b are open in a direction perpendicular to the axis direction. The polymeric members 11 each further has, in the connecting part which connects the wings to each other, a through-hole 11c for a grease nipple. The through-hole 11c is partly open in a direction perpendicular to the axis direction.

These through-holes 11a, 11b, and 11c have been formed so that ring-form sleeve members 11A, 11B, and 11C are respectively fitted thereinto as shown in FIG. 2. These ring-form sleeve members 11A, 11B, and 11C each is a short cylindrical member having a length slightly larger than the thickness of the lubricant-containing polymeric member 11 (L2 is longer than L1). The sleeve members 11A, 11B, and 11C have such outer diameters that they can be easily fitted into the through-holes 11a, 11b, and 11c, respectively. Thus, when the lubricant-containing polymeric member 11 is attached to the end cap 2B by screwing, the member 11 is prevented from being compressed excessively and the lubricant is prevented from being squeezed from the member 11.

The outer diameters of the ring-form sleeve members 11A, 11B, and 11C are respectively larger than the diameters of the through-holes 11a, 11b, and 11c. Due to such large sleeve diameters, the inner surfaces of the lubricant-containing polymeric member 11 can be kept being pressed tightly against outer surfaces of the guide rail 1, whereby the lubricant which is oozing out can be stably fed to the rail.

As shown in FIG. 2, the reinforcing plates 20 each is constituted of a nearly U-shaped steel or synthetic-resin plate conforming to the contour of the end cap 2B. Each reinforcing plate 20 has, in both wings thereof, through-holes 22a and 22b for penetrating attaching screws 21a and 21b therethrough, and further has, in the connecting part thereof which connects the wings to each other, a through-hole 22c for a grease nipple 7. These reinforcing plates 20 are not in contact with the guide rail 1.

In general, each lubricant-containing polymeric member 11 has been interposed between the side seal 10 and the reinforcing plate 20. However, since each lubricant-containing polymeric member 11, which is in close contact with outer surfaces of the guide rail, can perform the same sealing function as the side seal 10, the reinforcing plate 20 may be used as a substitute for the side seal 10. Alternatively, the reinforcing plate 20 and the lubricant-containing polymeric member 11 only may be attached in such a manner that the plate 20 is superposed on the front side of the member 11 and the back side of the member 11 is directly fitted to the end of the end cap 2B.

In this embodiment, attaching screws 21a and 21b are inserted into the through-holes 10a and 10b of each side seal 10, the sleeve members 11A and 11B of each lubricant-containing polymeric member 11, the through-holes 20a and 20b of each reinforcing plate 20, and the screw through-holes of each end cap 2B and screwed into the screw holes for attachment of the slider main body 2A. Thus, the side seal 10, the polymeric member 11, and the reinforcing plate 20 are integrally superposed on the corresponding end cap 2B and fixed to the main body 2A.

In this linear guide, the inside of the slider 2 may be filled with a grease. In this case, a grease for use in food-processing machines is preferably used which conforms to the FDA regulations and comprises a white mineral oil as a base oil and an aluminum soap as a thickener.

According to this embodiment, safe seals for a linear guide which are applicable to food-processing machines can be provided by using a material conforming to a food safety standard to form lubricant feeders which feeds a lubricant to the interfaces between the side seals 10 and the rail and to the linear guide itself.

Figure 4:
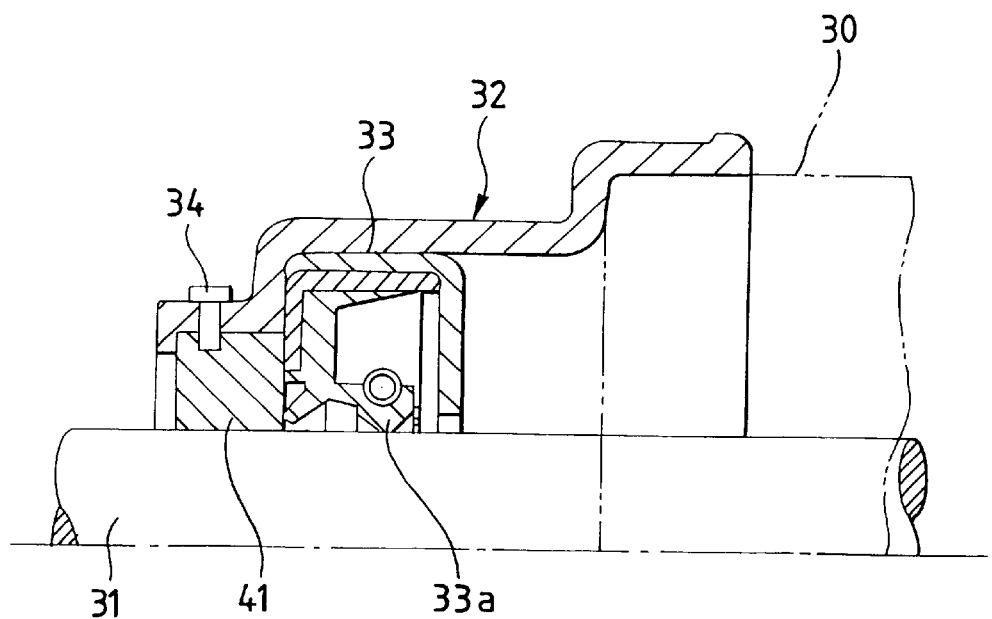
FIG. 4, showing the second embodiment of the present invention, is an axis-direction sectional view of an oil seal containing a lubricant feeder integrated thereinto for lubricant feeding o a sealing lip part.

FIG. 4, which illustrates the second embodiment of the lubricant feeder of the present invention, is an axis-direction partly sectional view of an oil seal containing the lubricant feeder integrated thereinto for lubricant feeding to a sealing lip part. This oil seal 33 is fitted through a housing 32 to an end part of a rotating shaft 31 supported by a bearing 30. The oil seal 33 has, disposed on the inner circumferential surface thereof, a sealing lip 33a made of a rubber. The sealing lip 33a is in contact with and slides on the outer circumferential surface of the rotating shaft 31 to thereby perform its sealing function. However, in order for the sealing lip 33a to retain its sealing performance and life, a lubricant should be continuously fed to the frictional contact interface between the rotating shaft 31 and the sealing lip 33a.

For this purpose, a lubricant-containing polymeric member 41 as a lubricant feeder has been fixed with a screw 34 to the tip of the housing 32 so as to be in contact with the oil seal 33. This lubricant-containing polymeric member 41 is a thick ring-shaped molding formed from a material composed, for example, of a polyethylene blend conforming to the FDA regulations and consisting of 20% by weight high-density polyethylene (molecular weight, $1 \times 10^4$ to $5 \times 10^5$) and 10% by weight ultrahigh-molecular polyethylene (molecular weight, $1 \times 10^6$ to $5 \times 10^6$) and a lubricant conforming to the FDA regulations and consisting of 70% by weight grease for food-processing machines comprising a white mineral oil as a base oil and an aluminum soap as a thickener, by plasticating (melting) the material with an injection molding machine, injecting the melt into a given mold, and then cooling the mold while pressurizing the contents to solidify the same. The inner circumferential surface of this ring-shaped molding is the frictional surface in contact with the rotating shaft 31.

When the rotating shaft 31 rotates, the lubricant-containing polymeric member 41 disposed at an end part thereof slides on the rotating shaft 31 while being in contact therewith (the member 41 is in sliding contact with the shaft 31). Under the influence of the frictional heat caused by the sliding, the lubricant contained in the structure of the lubricant-containing polymeric member 41 gradually oozes out with the lapse of time. The lubricant which has oozed out is fed to the oil seal 33 via the rotating shaft 31 and evenly diffuses throughout the whole sliding surface of the sealing lip 33a to thereby realize stable long-lasting sealing performance.

The lubricant-containing polymeric member 41 functions also as a sealing member to seal the end part of the rolling bearing 30. Namely, the polymeric member 41 and the oil seal 33 doubly seal the inside of the housing 32 to isolate the same from the surrounding atmosphere. Consequently, even when the surrounding atmosphere undesirably contains water, dust particles, etc., the inside of the rolling bearing 30 is protected against the water, dust particles, etc., whereby satisfactory lubrication can be maintained over long periods of time.

Figure 5:
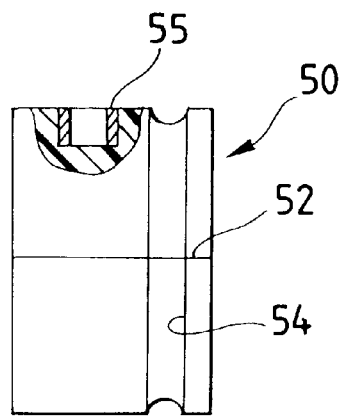
FIG. 5, showing the third embodiment of the present invention, is a partly cutaway side view of a sealing lubricant feeder applied to a sealed ball screw.
Figure 6:
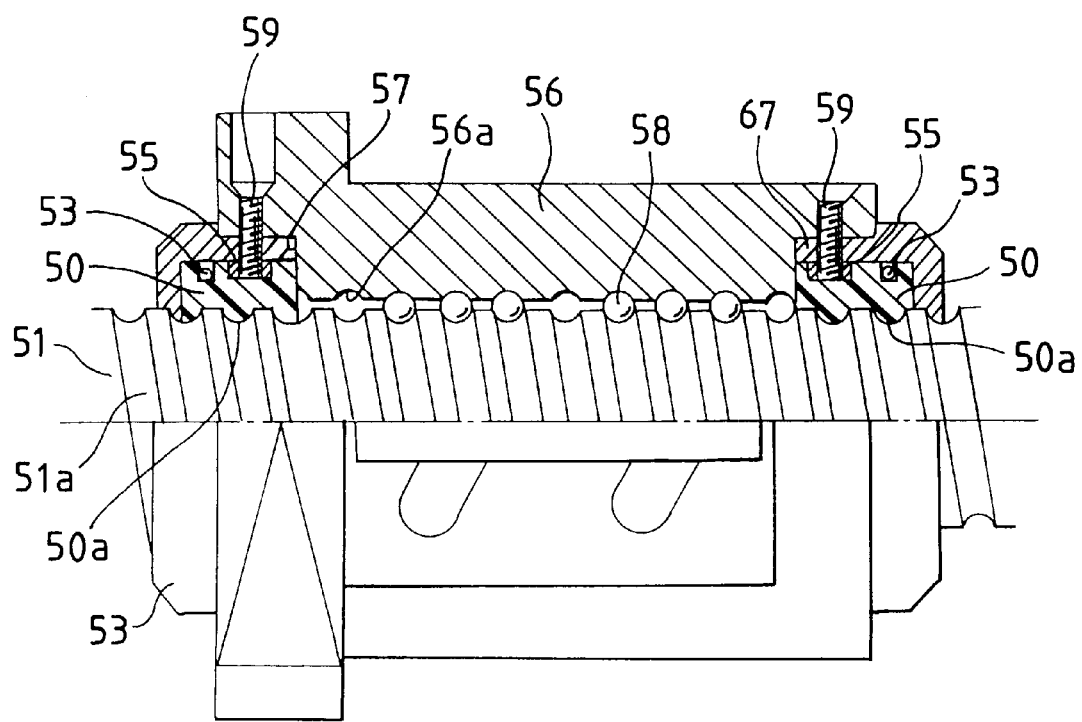
FIG. 6 is a longitudinal sectional view of a ball screw having lubricant feeder members of the above kind attached respectively to both ends of the nut.

FIGS. 5 and 6 illustrate the third embodiment of the lubricant feeder of the present invention. This embodiment comprises lubricant feeders 50 according to the present invention which have been attached as sealing lubricant feeders respectively to both ends of the nut of a sealed ball screw. FIG. 5 is a partly cutaway side view of one of the sealing members. FIG. 6 is a longitudinal sectional view of the ball screw having the sealing members attached respectively to both ends of the nut.

The lubricant feeders 50 are each in the form of a ring slightly long in the axis direction. The inner circumferential surface of each lubricant feeder 50 has a projection 50a which fits to the screw groove 51a of the thread shaft 51. Each ring 50 has one cut plane 52 at which the wall of the ring is split. The lubricant feeders 50 each has, on the outer circumferential surface thereof, a circular peripheral groove 54 into which a garter spring 53 is fitted.

Furthermore, a cylindrical reinforcing member 55 has been fitted to each lubricant feeder 50 in a position not interfering with the peripheral groove 54 (one reinforcing member only is shown). Each lubricant feeder 50 has been fixed to the nut by opening the ring at the cut plane 52, fitting the opened ring to the thread shaft 51, subsequently fitting the ring to the recessed part 57 in one end of the ball screw nut 56, and then screwing an attaching screw 59 from the side of the nut and engaging the tip of the screw 59 with the reinforcing member 55.

The lubricant feeder 50 which has been attached after having been opened at the cut plane 52 is elastically throttled with a garter spring 53, whereby the gap between the screw groove 51a of the thread shaft 51 and the projection 50a formed on the inner circumferential surface of the lubricant feeder 50 fitted thereto is kept zero or below. As a result, the lubricant gradually oozing out of each lubricant feeder 50 is automatically fed to the contact interfaces between the spiral screw groove 51a formed on the outer circumferential surface of the thread shaft 51 and balls 58 packed into the space between the groove 51a and the spiral screw groove 56a formed on the inner circumferential surface of the ball screw nut 56 and to the contact interfaces between the groove 56a and the balls 58. Thus, the lubricant not only inhibits frictional resistance from increasing, but also contributes to the lubrication of the ball screw itself.

In this ball screw, the inside of the ball screw nut 56 may be filled with a grease. In this case, a grease for use in food-processing machines is used which comprises a white mineral oil conforming to the FDA regulations as a base oil and an aluminum soap conforming to the FDA regulations as a thickener.

Due to the presence of the reinforcing members 55, the force of the attaching screws 58 is prevented from being directly imposed on the lubricant feeders 50. The lubricant feeders 50 can hence be constituted of a soft polymer containing a large amount of a lubricant.

The lubricant feeders 50, each comprising a molding of a lubricant-containing polymer, are formed from a material composed, for example, of a polyethylene blend conforming to the FDA regulations and consisting of 25% by weight high-density polyethylene (molecular weight, $1 \times 10^4$ to $5 \times 10^5$) and 10% by weight ultrahigh-molecular polyethylene (molecular weight, 1×10⁶ to 5×10⁶) and a lubricant conforming to the FDA regulations and consisting of 65% by weight white mineral oil, by plasticating (melting) the material with an injection molding machine, injecting the melt into a given mold, and then cooling the mold while pressurizing the contents to solidify the same.

Each lubricant feeder 50 has a covering member 67 attached thereto so as to cover the periphery of the lubricant feeder 50. The covering member 67 is made of a polyacetal and serves to both cover and seal. That part of the covering member 67 which meets the thread shaft 51 has a slight gap to constitute a labyrinth seal.

Figure 7:
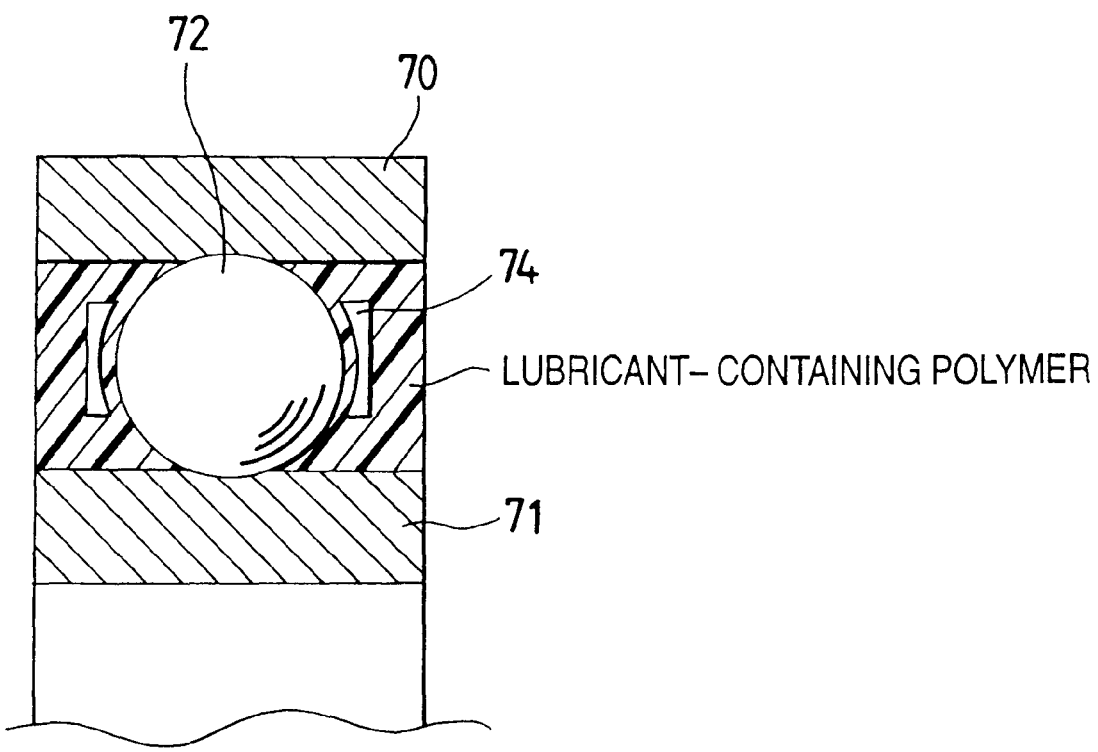
FIG. 7 showing the fourth embodiment of the present invention, is a diagrammatic view of a ball bearing containing a lubricant-containing polymer packed into the internal space between the inner ring and outer ring of the bearing.

FIG. 7, illustrating the fourth embodiment of the present invention, is a diagrammatic view of a ball bearing containing a rolling element 72 supported with a cage 74 between inner and outer rings 70 and 71 in a freely rotatable manner. The internal space of the bearing between the inner ring and the outer ring is filled with a lubricant-containing polymer. The lubricant-containing polymer has a composition consisting of 15% by weight high-density polyethylene conforming to the FDA regulations, 10% by weight ultrahigh-molecular polyethylene conforming to the FDA regulations, and 75% by weight white mineral oil conforming to the FDA regulations.

Lubricant-containing polymers for use in the above application were molded under the conditions shown below. Polymers respectively containing, as base lubricants, two lubricating oils for use in food-processing machines were examined for suitability for molding.

(1) White mineral oil (HIWHITE 350, manufactured by Nippon Oil Co., Ltd., Japan)

(2) Medium-chain fatty acid triglyceride FOODLE brand oil manufactured by Nippon Oil Co., Ltd.)

A mixture of 70% by weight lubricating oil (1) or (2) and 30% by weight powder of high-density polyethylene was heated to 160° C. with stirring and then solidified by cooling. During this heat treatment, each mixture was examined for state after having been heated and after having been cooled and solidified. The results obtained are shown in Table 1.

TABLE 1

(Results of Examination)

| Base lubricating oil for food-processing machines | State after heating | State after cooling and solidification |
| --- | --- | --- |
| White mineral oil | completely compatibilized transparent state | homogeneous white solid |
| Medium-chain fatty acid triglyceride | polyethylene melted as a separate phase (which might contain a slight amount of oil) | white solid parts consisting substantially of polyethylene coexisted with white creamlike parts |

Table 1 shows the following. When a white mineral oil is used as the base, a homogeneous lubricant feeder can be molded. However, if a medium-chain fatty acid triglyceride, which is an ester, is used alone in place of the white mineral oil, a homogenous lubricant feeder is difficult to obtain. In the lubricant-containing polymer obtained with the triglyceride, the polymer and the lubricant coexist in an unevenly mixed state and, hence, the two components are difficult to homogeneously unite with each other.

Consequently, those parts of the latter lubricant feeder which have a reduced polymer content undergo excessive wear by the action of rolling elements to thereby feed the lubricant at too high a rate, making it difficult to maintain lubricant feeding over long periods of time. The above results demonstrate that lubricants conventionally used in food-processing machines cannot necessarily or easily be utilized as lubricants in a lubricant feeder. Instead, compatibility between the lubricant and the material of the lubricant feeder (e.g., a polyolefin resin) must be considered.

Lubricants and resins which each not only conforms to the FDA regulations but satisfies one or more other (national or private) standards necessary for application to food-producing machines, medicine-producing machines, etc., e.g., food safety standards and food suitability standards, may be used.

The term "high-density polyethylene" as used herein means that the density of the polymer is, for example, from 0.94 to 0.97 g/cm³. The term "ultrahigh-density" as used herein means that the density of the polymer is higher than the upper limit.

As described above, the lubricant feeder of the present invention is a molded lubricant-containing polymer constituted of: a lubricant conforming to a food safety standard and comprising a white mineral oil or a grease comprising a white mineral oil as a base oil and an aluminum soap as a thickener; and a synthetic polyolefin resin. Therefore, the lubricant feeder is highly safe, and when attached to a part which needs lubrication, such as, e.g., a linear guide bearing, ball screw, or oil seal for medical apparatuses or cosmetic-producing machines, as well as for food-processing machines, it can satisfactorily maintain the lubrication of that part.

FIGS. 8(*a*) and (*b*) illustrate the fifth embodiment. Since the constitution of this embodiment is the same as that of the first embodiment except the lubricant-containing polymer member 11 as a lubricant supplier, its description will be omitted. The lubricant supply member 111, which is disposed interposed between the side seal 10 and the end cap 2B, is in almost inverted U-shaped form conforming the external shape of the end cap 2B. The inner portion of the inverted U-shaped form doesn't taper off but remains the same in thickness. The inner surface of the inverted U-shaped form doesn't come in contact with the guide rail 1. The gap between the inner surface of the inverted U-shaped form and the guide rail 1 is not specifically limited. It is preferably from 0.1 to 0.5 mm taking into account the transferability of the lubricant which has leaked from the pores in the porous sintered metal or porous sintered ceramics on the inner surface of the inverted U-shaped form to the guide rail (actually to the lip portion of the side seal as well).

As also shown in FIG. 8(*a*), which is a front view of the lubricant supply member 111, the lubricant supply member 111, too, comprises mounting screw holes 111*a* and 111*b* at both wings 111A and 111B, respectively, and a grease nipple hole 111*c* at the connecting portion 111C connecting the wings 111A and 111B.

The inner surface of the inverted U-shaped form is formed such that the foregoing predetermined gap is established with respect to the upper surface 1*a* of the guide rail 1 and the outer surface 1*b* including the rolling grooves 3, 3'. Further, the inner surface of the inverted U-shaped form comprises protrusions 111*d*, 111*e* 111*f* and 111*g* formed at portions where they oppose to the rolling grooves 3, 3' of the guide rail 1 in such an arrangement that they are close to the grooves 3, 3', respectively.

Figure 8A:
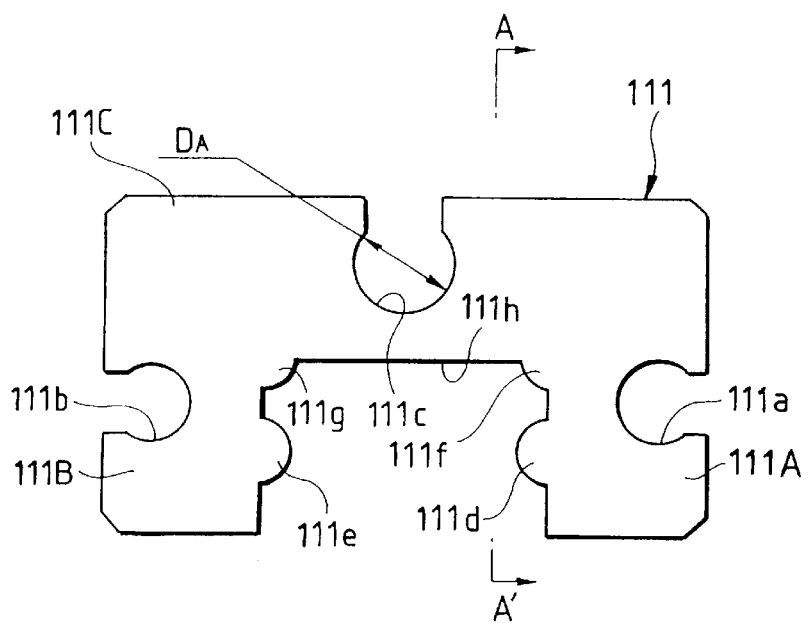
FIGS. 8(*a*) and 8(*b*), showing the fifth embodiment of the present invention, is a perspective view of a lubricant supply member.
Figure 8B:
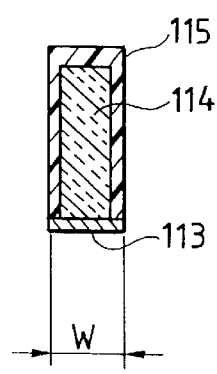

Referring to the interior of the lubricant supply member 111, as shown in FIG. 8(b), which is a sectional view taken on line A–A' of FIG. 8(a), the inner surface 113 is made of a porous sintered metal or porous sintered ceramics and the interior portion 114 is made of a porous member containing a lubricant or a grease. The contour portion 115, excluding the inner surface of 113, is made of a metal or a synthetic resin containing a reinforcing fiber. Preferred examples of these materials have been described above.

The supply of the lubricant can be controlled by the porosity and the width W of the porous sintered metal or porous sintered ceramics constituting the inner surface 113.

The present embodiment has been described with reference to the configuration that the side seal is disposed at the edge face of the lubricant supply member 111, but the seal may be disposed so as to partly occupy the space of the inner surface of the lubricant supply member 111.

As the contour member 115 of the lubricant supply member 111 there may be used the following material.

If the contour member 115 is made of metal, it may be aluminum, anodized aluminum, iron-based material such as bearing steel and SPCC material, corrosion-resistant iron-based material obtained by subjecting the iron-based material to corrosion-resisting surface treatment such as chromate treatment and KANIGEN process, copper-based material, stainless steel or the like. Among these metallic materials, corrosion-resistant materials are used if corrosion resistance is required depending on the working atmosphere of the linear guide bearing device. If corrosion resistance is not particularly required, aluminum or anodized aluminum (so called ALUMITE™), which has a light weight, can be used to minimize the weight increase of the linear guide bearing device to advantage.

If the contour member 115 is made of a synthetic resin, there may be preferably used a material which is oil-resistant enough not to swell in the lubricant incorporated, such as polyolefin resin such as polypropylene, polyacetal resin, polyamide resin (e.g., 4, 6-nylon, 6, 6-nylon), PPS (polyphenylene-sulfide) resin, polyamideimide resin, polyimide resin, polyetheretherketone resin and fluororesin (e.g., PTFE, ETFE). These synthetic resins may be used singly. Alternatively, a synthetic resin reinforced with a proper fiber may be used.

Preferred examples of the reinforcing fiber to be incorporated in the synthetic resin include glass fiber, potassium titanate whisker, aluminum borate whisker, carbon fiber, and aramide fiber.

As the lubricant-incorporated porous member constituting the interior 114 there may be preferably used a porous high molecular compound having continuous open cells. Specific examples of such a porous high molecular compound include soft urethane foam, polystyrene foam, polyvinyl chloride foam, phenolic resin foam, urea resin foam, polyvinyl alcohol foam, viscose sponge, rubber foam, and syntactic foam.

As the lubricant to be incorporated in the foregoing porous member there may be preferably used white mineral oil or middle-chain aliphatic acid triglyceride.

As the grease to be incorporated in the contour portion there may be preferably used a grease comprising white mineral oil as a base oil having aluminum soap incorporated therein as an extender.

As the porous sintered metal constituting the inner surface 113 there may be used iron-based material, copper-based material, stainless steel-based material, nickel-based material, chromium-based material or the like. As the iron-based material there may be an iron alloy containing about from 0.2 to 25% by weight of copper, lead or graphite as an alloying component besides single iron. As the copper-based material there may be used a copper alloy containing as an alloying component about from 0.2 to 15% by weight of iron, tin, lead, zinc or graphite as well.

As the porous sintered ceramics there may be used alumina, zirconia or the like.

The porosity of the porous sintered metal and porous sintered ceramics is preferably from 10 to 35 vol %. If the porosity of these materials falls below 10 vol %, these materials exhibit too small a permeability to lubricant to supply enough lubricant to the guide rail, making it impossible to stably keep the running of the linear guide bearing device lubricated if the linear guide bearing device is not filled with grease thereinside or grease has disappeared for some reasons. On the contrary, if the porosity of these materials exceeds 35 vol %, these materials allow the permeation of lubricant so fast that the lubricant incorporated is exhausted too early and these materials exhibit a reduced mechanical strength that causes destruction.

In accordance with the foregoing fifth embodiment, the medium containing a lubricant is a porous member or a material having a grease incorporated in the contour portion thereof, making it possible to have a lubricant incorporated therein regardless of the kind thereof. Accordingly, the use of the same lubricant as used in the first embodiment makes it possible to exert similar effects.

While the invention has been described in detail and with reference to specific embodiments thereof, it will be apparent to one skilled in the art that various changes and modifications can be made therein without departing from the spirit and scope thereof.

What is claimed is:

1. A lubricant feeder, made of synthetic resin containing a lubricant and having a constitution which is suitable for application to members requiring lubrication, which is operative to gradually ooze out and feed said lubricant to said members, wherein said lubricant is a white mineral oil or a grease including a white mineral oil as a base oil and aluminum soap as a thickener, and said synthetic resin comprises a polyolefin resin.

2. The lubricant feeder according to claim 1, in which the content of said lubricant in the lubricant feeder is from 10% to 90% by weight.

3. The lubricant feeder according to claim 2, in which the content of said lubricant in the lubricant feeder is from 50% to 80% by weight.

4. The lubricant feeder according to claim 1, in which said synthetic resin is selected from the group consisting of polyethylene, polypropylene, and polymethylpentene.

5. A linear apparatus comprising:

a lubricant feeder made of polyolefin resin and mounted on a guided member to be guided by a guiding member, wherein said lubricant feeder is operative to gradually ooze out and feed a lubricant to said guiding member, and further wherein said lubricant is selected from the group consisting of: a white mineral oil and a grease including a white mineral oil as a base oil and aluminum soap as a thickener.

6. The linear apparatus according to claim 5, in which said linear apparatus is selected from the group consisting of a linear guide bearing and a ball screw.

7. A linear apparatus comprising:

a guiding member;

a guided member a movement of which is guided by said guiding member; and a lubricant feeder mounted on said guided member, wherein the inside of said guided member is filled with a grease including a white mineral oil as a base oil and aluminum soap as a thickener, and further wherein said lubricant feeder is made of polyolefin resin.

8. The linear apparatus according to claim 7, in which said linear apparatus is selected from the group consisting of a linear guide bearing and a ball screw.

* * * * *